(12) United States Patent
Schaefer et al.

(10) Patent No.: US 8,926,002 B2
(45) Date of Patent: Jan. 6, 2015

(54) MOTOR VEHICLE BODY

(75) Inventors: Joachim Schaefer, Darmstadt (DE); Uwe Schmitz, Nauheim (DE); Stefan Wolff, Hochheim (DE); Stephan Walter, Ringheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 13/589,243

(22) Filed: Aug. 20, 2012

(65) Prior Publication Data

US 2013/0049400 A1 Feb. 28, 2013

(30) Foreign Application Priority Data

Aug. 20, 2011 (DE) .......................... 10 2011 111 237

(51) Int. Cl.
*B62D 25/08* (2006.01)
*B60R 21/34* (2011.01)

(52) U.S. Cl.
CPC .............. *B62D 25/081* (2013.01); *B60R 21/34* (2013.01); *B60R 2021/343* (2013.01)
USPC .................................................... 296/187.04

(58) Field of Classification Search
USPC .................. 296/197.04, 197.09, 192, 201, 70
See application file for complete search history.

(56) References Cited

U.S. PATENT DOCUMENTS

| 6,193,304 | B1 * | 2/2001 | Takahashi et al. ............ 296/192 |
| 6,193,305 | B1 * | 2/2001 | Takahashi .................... 296/192 |
| 6,769,730 | B2 * | 8/2004 | Okamoto et al. .......... 296/96.22 |
| 7,357,446 | B2 * | 4/2008 | Sakai et al. ................... 296/192 |
| 7,552,964 | B2 * | 6/2009 | Saito ............................. 296/192 |
| 2008/0211255 | A1 | 9/2008 | Saito |
| 2008/0284208 | A1 * | 11/2008 | Kannan et al. ................ 296/192 |

FOREIGN PATENT DOCUMENTS

| DE | 19921871 A1 | 11/1999 |
| DE | 602004002913 T2 | 6/2007 |
| JP | 2004217144 A | 8/2004 |
| JP | 2008100533 A | 5/2008 |
| JP | 2009179249 A | 8/2009 |

* cited by examiner

*Primary Examiner* — Glenn Dayoan
*Assistant Examiner* — Sunsurraye Westbrook
(74) *Attorney, Agent, or Firm* — Ingrassia Fisher & Lorenz, P.C.

(57) ABSTRACT

A motor vehicle body includes, but is not limited to a front hood, a windshield rising from a rear edge of the front hood and a cross member substantially extending over the width of the windshield, of which a front edge supports a front lower edge of the windshield and a rear edge is supported on a structural element of the body. A top side of the cross member faces the passenger cell and a bottom side faces the engine compartment. Between the front edge and the rear edge the cross member comprises at least one first region, in which the top side is concavely curved in a section plane running in vehicle longitudinal direction and which yields to a load by intensifying the curvature along an apex line yielding towards the engine compartment and pivoting of two zones extending on both sides of the apex line towards each other.

12 Claims, 3 Drawing Sheets

MOTOR VEHICLE BODY

CROSS-REFERENCE TO RELATED APPLICATION

This application claims priority to German Patent Application No. 10 2011 111 237.9, filed Aug. 20, 2011, which is incorporated herein by reference in its entirety.

TECHNICAL FIELD

The technical field relates to a motor vehicle body with a front hood, a windshield rising from a rear edge of the front hood and a cross member supporting a front lower edge of the windshield.

BACKGROUND

From DE 10 2007 012 830 A1 a motor vehicle is known, A cross member supporting the windshield is composed of two member parts interconnected at its front and rear edges. The upper member part is arched upwards in cross section, with a front section supporting a front edge of the windshield and rising against the driving direction, a substantially horizontal middle section and a rear section steeply dropping against the driving direction. If this vehicle is involved in an accident with a pedestrian, the latter normally crashes onto the hood obliquely from the top. The pedestrian pivots about an axis that is normally located approximately at the front edge of the hood.

Thanks to a fold in its front section, the upper member part initially yields fairly easily. However, the resistance of the cross member increases once the lower member part is also affected by the deformation, or once the deformation reaches the rear section of the upper member part, which is oriented almost parallel to the impact direction and therefore resists the deformation with a high resistance. This makes adherence to valid limit values difficult in the case of an impact on the known cross member.

In view of the foregoing, at least one object is to state a motor vehicle body with a cross member supporting a windshield, where the risk of injuries is reduced when a head strikes the cross member. In addition, other objects, desirable features and characteristics will become apparent from the subsequent summary and detailed description, and the appended claims, taken in conjunction with the accompanying drawings and this background.

SUMMARY

A motor vehicle body is provided having a front hood, a windshield rising from a rear edge of the front hood and a cross member substantially extending over the width of the windshield, of which a front edge supports a front lower edge of the windshield and a rear edge is supported on a structural element of the body. A top side faces the passenger cell and a bottom side faces the engine compartment, the cross member between its front edge and its rear edge comprises at least one first region, in which the top side facing the passenger cell is concave in a sectional plane running in vehicle longitudinal direction and that yields to a load by increasing the curvature along a apex line giving way towards the engine compartment and pivoting two zones extending on both sides of the apex line towards each other. In that the concavity substantially predetermines the location at which the apex line under the load of the impact of a pedestrian will form or become clearly more prominent through the increase of its curvature, the force that is required for compressing the first section can be reproducibly adjusted to a value that is compatible with the valid legal requirements.

In order to favor the pivoting of the two zones towards each other, it is advantageous when the two zones are approximately symmetrical with respect to a mirror plane that is oriented transversely to the direction of the action of the force, i.e., drops towards the front. Since an exact symmetry is not required, the approximate symmetry can be paraphrased in particular in that the mirror plane is to be present as a bisector of an angle of two secants, which cross the apex line and at the same distance from the apex line, the two zones. The slope of this angle bisector can correspond to that of the windshield or be between the slope of the front hood and the slope of the windshield.

In order to facilitate a reproducible insertion of the deformation, the angle spanned by the secants at the location of the apex line is to be not too close to approximately 180°, preferentially it is smaller than approximately 120°. In order to favor the yielding movement along the apex line, the cross member should be freely supporting between its front and rear edge.

The apex line can already be pre-formed as bend on the cross member in its under-formed state, so that even in this state the two zones span a defined angle along the apex line, which only becomes smaller under the load of an impact. Preferentially, however, the first region is continuously curved in section along said sectional plane so that a bend only forms during the course of the deformation. In this manner, a required load capacity of the cross member can be achieved with reduced material use than is the case with a preformed bend. Preferentially, the said first region extends over the predominant part of the width of the windshield in order to guarantee as uniform as possible a deformation behavior in the event of an impact over the entire width of the windshield.

In order to favor a compression of the first region during the impact through the two zones approaching each other it is advantageous when the rear edge of the cross member is located lower than its front edge. In particular, the first region can then be located in a rear lower part of the cross member in order to become effective when other possibilities of the deformation of the cross member in a front upper part of the cross member more closely adjacent to the windshield are exhausted. Such a front upper part preferentially drops less steeply downwards to the rear than the rear lower part, so that it is locally dented through the impact of a pedestrian but not compressed over a large width. The front upper part of the cross member can in particular follow a wavy course in a section in vehicle transverse direction in order to be able to yield to a pressure acting thereupon during the impact of a pedestrian by stretching the waves.

The cross member can have a second region with concave top side and a third region located between the first and second region with convex top side in order to increase the length of the travel over which a deceleration of the pedestrian through compressing the cross member can take place. Alternatively, it can be provided for the same purpose that the cross member comprises a second and third region with convex top side, which flank the first region. These three regions can directly adjoin one another as well as the front and rear edge of the cross member.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
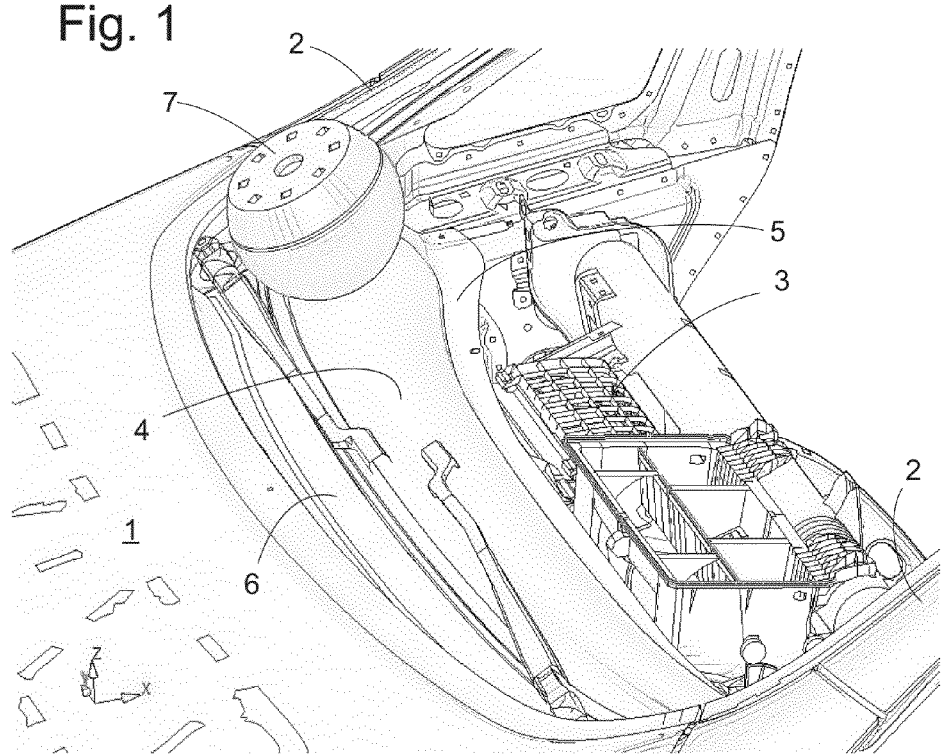
FIG. 1 is a perspective view of a part of a motor vehicle body to which the present invention can be applied, and an impactor simulating the impact of the head of a pedestrian.

FIG. 1 shows a perspective view of a part of a motor vehicle body. The rear region of a front hood 1 and a window opening adjoining thereon, which with the finished vehicle receives a windshield flanked by A-pillars 2, is visible. An instrument panel covering is omitted in FIG. 1 in order to be able to show installations 3 of the instrument panel located below and a cross member 4 formed from a single-layer sheet metal cutting, which with the finished vehicle are concealed under the instrument panel covering. A rear edge 5 of the cross member 4 supports the upper edge of a separating wall, which extends between passenger cell and engine compartment. A front edge 6 of the cross member 4 supports a front lower edge of the windshield. An impactor 7 shown above the cross member 4 shows the position in which, when the vehicle collides with an adult pedestrian of normal size and said pedestrian strikes the front hood 1, the head of said pedestrian strikes the bodywork. The impact point is located in a lower region of the windshield above the cross member 4.

Figure 2:
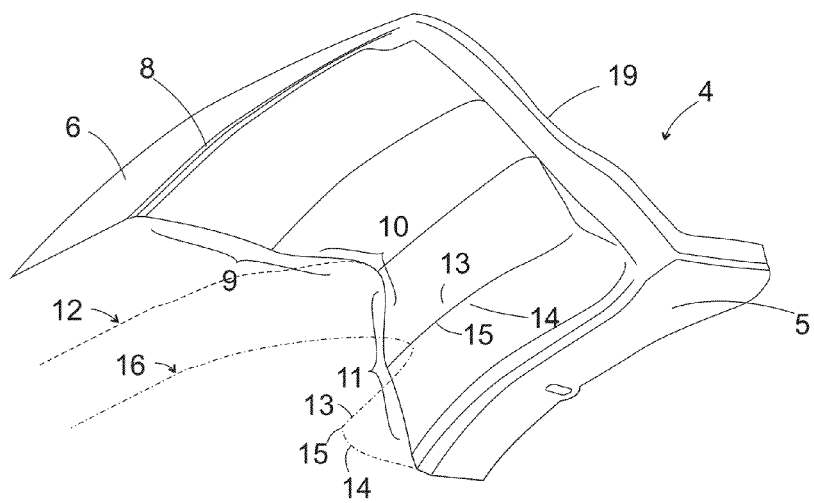
FIG. 2 is a part view of a cross member according to a first embodiment.

FIG. 2 schematically shows a perspective view of a cut-off lateral end piece of the cross member 4 on the right from the driver's view. On the section edge of the cross member 4 facing the beholder its cross-sectional course is clearly visible. The front edge 6 extends in direct contact with the windshield and is areally glued to the latter. Along a first bending zone 8 extending over the entire width of the windshield, the cross member separates from the windshield and a region 9, which is concavely curved in section in vehicle longitudinal direction towards the passenger cell, follows. This is followed by a region 10 that is convex towards the passenger cell and a second concave region 11 extends between the convex region 10 and the rear edge 5.

When the impactor 7 strikes through the windshield and deforms the cross member 4, the front edge 6 and the region 9 can initially yield subject to the intensification of the curvature in the convex region 10, as is shown in FIG. 2 by an interrupted course of the section line designated 12. With increasing deformation of the cross member 4, the convex region 10 also starts to give way. An apex line 15 of the concave region 11 subject to the intensification of its curvature is displaced in the direction of the engine compartment and in the process, segment 13, 14 pivots towards each other on different sides of the apex line 15, as is illustrated through the dash-dotted section line 16.

Figure 3:
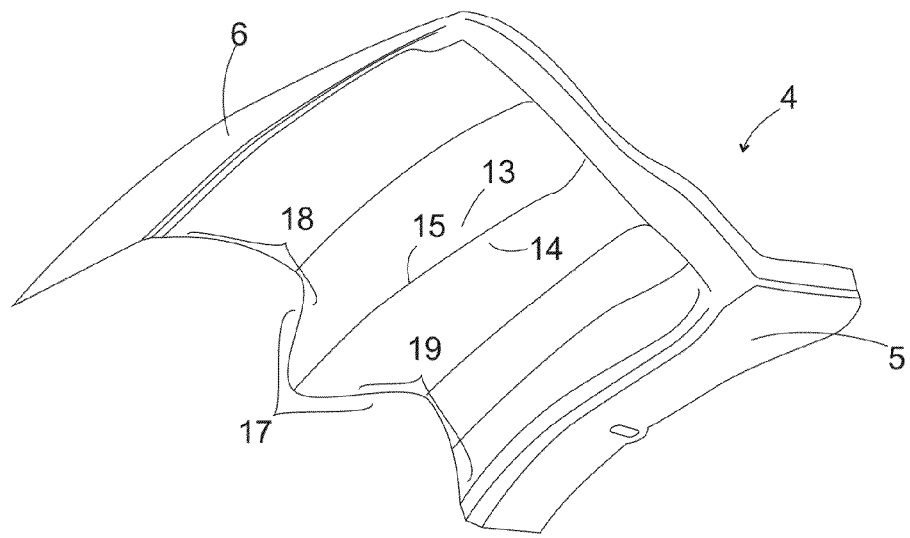
FIG. 3 is a part view of a cross member according to a second embodiment.

A similar behavior during the impacting of the impactor 7 can be realized with the cross member shown in FIG. 3. Here, a region 17 with the concave side facing the passenger cell is flanked on both sides by convex regions 18 and 19. Here, too, segments 13, 14 start to pivot towards each other on both sides of an apex line 15 of the concave region 17 when the deformation in the front region of the cross member 4 exceeds a certain dimension, while the apex line 15 between them yields in the direction of the engine compartment.

Figure 4:
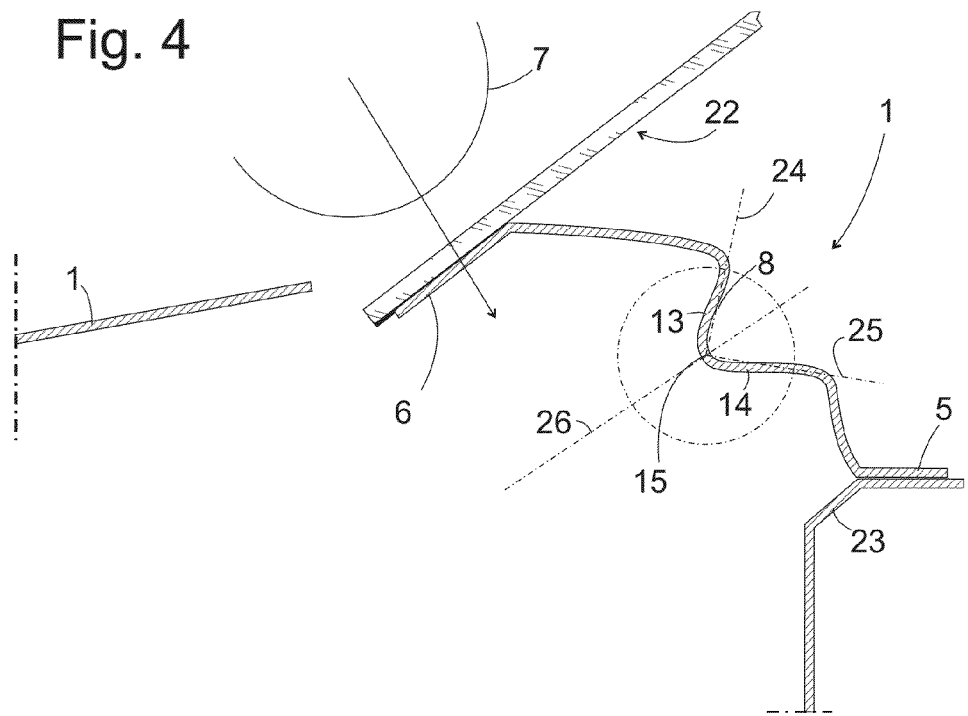
FIG. 4 is a schematic section through the cross member of FIG. 3 and its surroundings.

FIG. 4 shows a schematic section through the cross member 4 of FIG. 3, installed in a motor vehicle body. Visible is the windshield, designated 22, onto which the front edge 6 of the cross member 4 is glued and the separating wall between passenger cell and engine compartment, designated 23, which supports the rear edge 5 of the cross member 4. About the point of greatest curvature of the concave region 17, there, where the apex line 15 crosses the section plane, a circle is drawn in and two secants 24, 25 extend between the apex line 15 and section points of the circle with the segments 13, 14 of the cross member 4. At the apex line 15, the secants span an angle facing the passenger cell in this case of slightly under 90°, and a bisector 26 of the angle slopes towards the front, towards the engine compartment.

Figure 5:
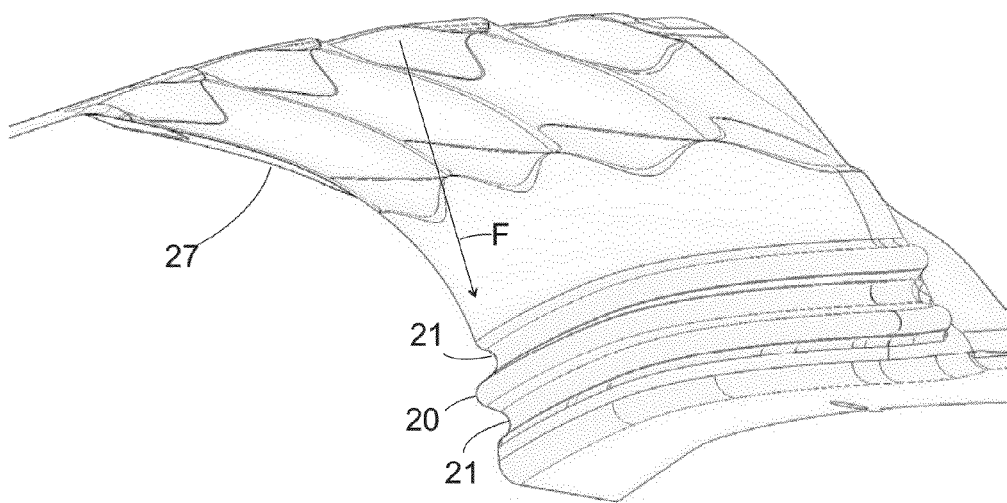
FIG. 5 is a part view of a cross member according to a third embodiment.

FIG. 5 shows a third configuration of the cross member 4, which differs from those of FIGS. 2 and 3 through two different aspects that can be realized independently of each other. According to the first embodiment, a plurality of narrow concave and convex regions 20, 21 are formed in a steeply dropping rear part of the cross member 4, near the rear edge 5, which can yield to a force in impact direction of the impactor 7, illustrated by an arrow F, by folding in the manner of a concertina.

In order to relieve the load of this rear part of the cross member 4 in an initial phase of the impact of the impactor 7, said cross member is provided with a wavy structure in section in vehicle transverse direction in a front region. This wave shape allows the cross member 4 to locally yield to the impact of the impactor 7 since a dent directed downwards can be formed at the place of impact without having to stretch the material of the cross member 4 for this purpose. In this manner, the windshield can be supported by the cross member 4 with high load capacity distributed over its entire lower edge while at the same time, in the case of only local loading, as occurs during the impact of the impactor 7, the window can be rendered relatively easily yielding after overcoming an initial resistance, so that low HIC-values can be achieved.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle body, comprising:
   a front hood;
   a windshield rising from a rear edge of the front hood;
   a cross member substantially extending over a width of the windshield of which a front edge supports a front lower edge of the windshield and the rear edge is supported on a structural element of the motor vehicle body and a top side faces a passenger cell and a bottom side faces an engine compartment,
   wherein the cross member between the front edge and the rear edge comprises a first region in which a top side is concavely curved in a section plane running in a vehicle longitudinal direction, wherein the first region is flanked on both sides by convex regions, and wherein the first region yields to a load by intensifying a curvature along an apex line yielding towards the engine compartment and pivoting the convex regions towards each other.

2. The motor vehicle body according to claim 1, wherein two secants that cross the apex line and at the same distance from the apex line define the convex regions.

3. The motor vehicle body according to claim 2, wherein the two secants are configured to cross each other at the angle of below approximately 120°.

4. The motor vehicle body according to claim 1, wherein the cross member is freely supporting between the front edge and the rear edge.

5. The motor vehicle body according to claim 1, wherein the first region is continuously curved with a concaved top side in section along a section line.

6. The motor vehicle body according to claim 1, wherein the first region extends over a predominant part of the width of the windshield.

7. The motor vehicle body according to claim 1, wherein the rear edge of the cross member is located lower than the front edge of the cross member.

8. The motor vehicle body according to claim 7, wherein the first region with a concave top side is located in a rear lower part of the cross member.

9. The motor vehicle body according to claim 8, wherein the rear lower part on average drops more steeply to the rear than a front upper part of the cross member.

10. The motor vehicle body according to claim 8, wherein a front upper part of the cross member follows a wavy course in a section in a vehicle transverse direction.

11. The motor vehicle body according to claim 6, wherein the cross member comprises a second region with concave top side and a third region located between the first region and the second region with a convex top side.

12. The motor vehicle body according to claim 11, wherein the first region, and the convex regions are configured to directly adjoin one another and the front edge and the rear edge.

* * * * *